United States Patent
Wala et al.

(10) Patent No.: US 10,616,149 B2
(45) Date of Patent: Apr. 7, 2020

(54) OPTIMIZING EVALUATION OF EFFECTIVENESS FOR MULTIPLE VERSIONS OF ELECTRONIC MESSAGES

(71) Applicant: THE ROCKET SCIENCE GROUP LLC, Atlanta, GA (US)

(72) Inventors: Mardav Wala, Atlanta, GA (US); Guan Liao, Tucker, GA (US); Michaela Moore, Decatur, GA (US); John Foreman, Avondale Estates, GA (US)

(73) Assignee: THE ROCKET SCIENCE GROUP LLC, Atlanta, GA (US)

( * ) Notice: Subject to any disclaimer, the term of this patent is extended or adjusted under 35 U.S.C. 154(b) by 0 days.

(21) Appl. No.: 15/748,085

(22) PCT Filed: Aug. 10, 2016

(86) PCT No.: PCT/US2016/046265
§ 371 (c)(1),
(2) Date: Jan. 26, 2018

(87) PCT Pub. No.: WO2017/027546
PCT Pub. Date: Feb. 16, 2017

(65) Prior Publication Data
US 2018/0219808 A1 Aug. 2, 2018

Related U.S. Application Data

(60) Provisional application No. 62/203,273, filed on Aug. 10, 2015.

(51) Int. Cl.
*G06F 3/0482* (2013.01)
*H04L 12/58* (2006.01)
*G06F 3/0484* (2013.01)
*H04L 12/24* (2006.01)

(52) U.S. Cl.
CPC ............ *H04L 51/04* (2013.01); *G06F 3/0482* (2013.01); *G06F 3/04847* (2013.01);
(Continued)

(58) Field of Classification Search
CPC ........ G06F 8/20; G06F 3/0481; G06F 3/0484; G06F 3/0488; G06F 15/16;
(Continued)

(56) References Cited

U.S. PATENT DOCUMENTS 7,458,098 B2 * 11/2008 Judge .................. H04L 63/1416
713/151
8,549,522 B1 * 10/2013 Chatterjee ........... G06F 11/3672
718/102

(Continued)

FOREIGN PATENT DOCUMENTS

| KR | 1020020040958 A | 5/2002 |
|---|---|---|
| WO | 2017027546 A1 | 2/2017 |

OTHER PUBLICATIONS

PCT/US2016/046265, International Search Report and Written Opinion, dated Nov. 17, 2016, 9 pages.

*Primary Examiner* — Steven P Sax
(74) *Attorney, Agent, or Firm* — Kilpatrick Townsend & Stockton LLP

(57) ABSTRACT

In certain embodiments, evaluations of effectiveness are optimized for multiple electronic message versions. For example, a server receives, subsequent to first electronic messages being transmitted over a first time period, responsive electronic data automatically generated by interactions with these messages. The server controls, based on the responsive electronic data, transmission of second electronic messages to recipients. For instance, the server provides an interface for configuring a test transmission of different test message versions to segments of recipients, where each version includes a different combination of message attri- (Continued)

butes. The server receives a selection of options via the interface for the test transmission, identifies an adverse impact on the test transmission associated with the selection, and indicates the adverse impact via the interface. The server subsequently receives, via the interface, a modification to the test transmission options. The server uses the modified options to transmit the second electronic messages.

24 Claims, 8 Drawing Sheets

(52) U.S. Cl.
CPC .............. *H04L 41/22* (2013.01); *H04L 51/22* (2013.01); *H04L 51/34* (2013.01); *H04L 51/02* (2013.01)

(58) Field of Classification Search
CPC ... G06F 3/04847; G06F 3/0482; G09B 19/00; H04L 51/02; H04L 51/04; H04L 51/22; H04L 51/34; H04L 41/22
See application file for complete search history.

(56) References Cited

U.S. PATENT DOCUMENTS

| | | | |
|---|---|---|---|
| 9,736,147 B1 * | 8/2017 | Mead | H04L 63/083 |
| 9,911,128 B2 * | 3/2018 | Chestnut | G06Q 30/02 |
| 10,074,031 B2 * | 9/2018 | Krenzer | G06K 9/4633 |
| 2004/0153822 A1 * | 8/2004 | Arcand | G01R 31/318307 714/38.14 |
| 2005/0222903 A1 * | 10/2005 | Buchheit | G06Q 10/107 705/14.54 |
| 2007/0124144 A1 * | 5/2007 | Johnson | H04W 4/90 704/246 |
| 2008/0306810 A1 | 12/2008 | Ranka et al. | |
| 2009/0049144 A1 * | 2/2009 | Suzuki | G06Q 10/107 709/206 |
| 2009/0083589 A1 * | 3/2009 | Fulton | G05B 19/05 714/48 |
| 2009/0149983 A1 * | 6/2009 | Dennis | G05B 19/41875 700/111 |
| 2009/0157511 A1 * | 6/2009 | Spinnell | G06Q 30/02 705/14.1 |
| 2010/0161506 A1 * | 6/2010 | Bosenick | G06Q 30/02 705/347 |
| 2012/0042025 A1 | 2/2012 | Jamison et al. | |
| 2013/0226862 A1 * | 8/2013 | Tang | G06F 17/30345 707/609 |
| 2014/0012922 A1 * | 1/2014 | Wu | G06F 16/972 709/205 |
| 2016/0224320 A1 * | 8/2016 | Jemiolo | G06Q 50/01 |
| 2017/0302430 A1 * | 10/2017 | Zuniga | H04L 7/0016 |

\* cited by examiner

FIG. 4

OPTIMIZING EVALUATION OF EFFECTIVENESS FOR MULTIPLE VERSIONS OF ELECTRONIC MESSAGES

CROSS-REFERENCE TO RELATED APPLICATIONS

A priority claim is hereby made to U.S. Provisional Application Ser. No. 62/203,273, filed Aug. 10, 2015 and titled "Systems and Methods for Determining and Sending a Preferred Electronic Mail Communication Using Multiple Variables," the contents of which are incorporated herein by reference.

TECHNICAL FIELD

This disclosure relates generally to computer-implemented methods and systems and more particularly relates to optimizing evaluations of effectiveness for multiple versions of electronic messages transmitted to multiple segments of recipients.

BACKGROUND

Electronic messages, such as e-mails and text messages, can be used by vendors and other businesses to induce customers and other users to access online content. For example, e-mails may be sent to users that have links to online video content, image content, or text content that describes different products or services. A user may click one or more links in an e-mail to access this online content via a website that is affiliated with a sender of the e-mail.

Current solutions for generating these electronic messages may present disadvantages. For example, certain attributes of an e-mail or other electronic message, such as a layout of content within the e-mail or a time at which the e-mail is received, may impact the likelihood that a recipient will click a link or otherwise interact with the electronic content of the message. Thus, for at least some recipients, the e-mail may be unsuccessful in causing a recipient to access related online content, regardless of whether the user might be interested in the online content.

SUMMARY

According to certain embodiments, systems and methods are provided for optimizing evaluations of effectiveness for multiple versions of electronic messages transmitted to multiple segments of recipients. In one example, a server receives, subsequent to first electronic messages being transmitted during a first time period, responsive electronic data automatically generated by interactions with the first electronic messages. The server controls, based on receiving the responsive electronic data, transmission of second electronic messages to recipients via a data network. For instance, the server provides an interface for configuring a test transmission of different test message versions to segments of recipients, where each version includes a different combination of message attributes. The server receives a selection of options via the interface for the test transmission, identifies an adverse impact on the test transmission associated with the selection, and indicates the adverse impact via the interface. The server subsequently receives, via the interface, a modification to the test transmission options. The server uses the modified options to transmit the second electronic messages.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying figures.

FIG. 4 is a diagram depicting an example of an interface used by the message management application of FIG. 1 for selecting different message attributes of different electronic message versions according to certain embodiments of the present disclosure.

DETAILED DESCRIPTION

Figure 1:
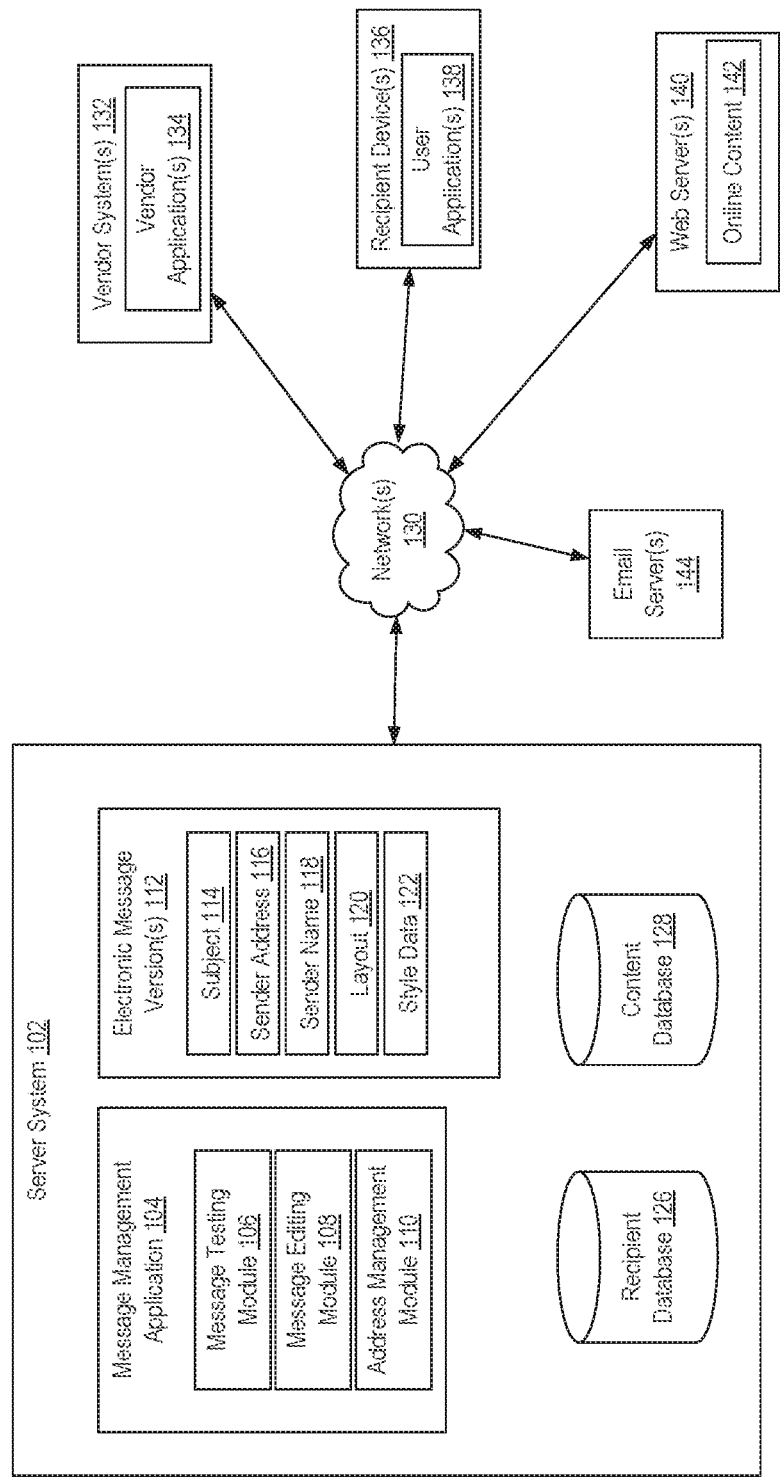
FIG. 1 is a block diagram depicting an example of a system including a server that executes a message management application for evaluating the effectiveness of multiple versions of electronic messages transmitted to multiple segments of recipients according to certain embodiments of the present disclosure.

Improved systems and techniques are disclosed for optimizing evaluations of effectiveness for multiple versions of electronic messages transmitted to multiple segments. For example, emails or other electronic messages may be transmitted to a large pool of recipients. Modifying the attributes of these electronic messages (e.g., a subject line, a sender address, a sender name, a layout of content, or a style applied to the content) can affect the likelihood of a recipient interacting with the electronic message in a desired manner. For example, a certain combination of a subject line, layout, and sender name may be more likely to cause a recipient to open an email, click on a link in an email, or perform some other action that involves interacting with the content of the email. To evaluate effectiveness of different versions of the electronic message having different combinations of message attributes, multiple test message versions can be transmitted to multiple segments of recipients, and evaluated over a time period. This evaluation process can be optimized or otherwise improved by, for example, ensuring that the test message versions are sent to segments of sufficient size, ensuring that an appropriate time period is used for monitoring interactions (e.g., clicks on links, opened emails, etc.), ensuring that sufficiently different values are selected for message attributes being varied, or otherwise performing a test transmission of electronic messages in accordance with certain options that are more likely to yield helpful information about the effectiveness of these messages.

In accordance with some embodiments, a message management application is executed on a server to optimize the effectiveness of a test transmission of electronic messages. For example, the message management application allows vendors and other users to select a number of different test message versions to be used and to select certain combinations of message attribute values for the test message versions. The message management application determines if one or more options selected by a user may adversely impact the effectiveness of the test transmission. In one example, a user may select too many different test message versions, such that each segment of recipients that receives a given test message version is too small to provide an accurate evaluation of how recipients will respond to that test message version. In another example, a user may select a time period over which to measure the effectiveness of the various test message versions that is too short to accurately evaluate how many recipients have responded favorably to the test message. For example, if most users open a message within three hours of receiving it, and a testing period is only one hour, then the test transmission may not accurately reflect how many users actually interacted with the test message.

For these and other use cases in which the selected options for a test transmission will adversely impact evaluations of effectiveness for test message versions, the message management application can warn a user of the adverse impact. In one example, if the segment size is too small, the message management application can display a suggestion to decrease the number of test message versions used or to otherwise increase the segment size (e.g., by increasing the pool of test recipients). In another example, if the testing period is too short, the message management application can display a suggestion to increase the time period over which the effectiveness of test message versions will be evaluated.

Additionally or alternatively, the message management application can reject user inputs that would result in adverse impacts to the test transmission. For example, if a user attempts to use too many test message versions, the message management application can modify the user's selection so that the maximum number of test message versions is used instead. Likewise, if a user attempts to select a testing period that is too short, the message management application can modify the user's selection so that a testing period of a minimum duration is used.

Referring now to the drawings, FIG. 1 is a block diagram depicting an example of a system including a server system 102 that executes a message management application 104 for optimizing evaluations of effectiveness for multiple versions of electronic messages transmitted to multiple segments. The message management application 104 can be used to generate, modify, select, or otherwise use one or more electronic message versions 112 for electronic messages to be transmitted via a data network 130 (e.g., e-mails, multimedia messages that can be delivered to smart phones, push notification dialogs, web pages, etc.).

The server system 102 can communicate with one or more vendor systems 132 and one or more recipient devices 136 via one or more of signals communicated via one or more data networks 130. The server system 102 can include one or more processing devices. In some embodiments, the server system 102 can be a single server. In other embodiments, the server system 102 can include multiple computing systems that are configured for distributed computer (e.g., grid-based computing, cloud computing, etc.).

The server system 102 can include or have access to one or more non-transitory computer-readable media on which program code and electronic data are stored. The program code includes a message management application 104. The electronic data includes one or more electronic message versions 112.

The message management application 104 is executable by a processing device to perform one or more operations for generating or modifying customized electronic message versions 112. Different electronic message versions 112 can have different combination of message attributes. As depicted in FIG. 1, examples of the variable message attributes for a given electronic message version include (but are not limited to) a subject 114, a sender address 116 identifying the email address or other network address displayed by the electronic message, a sender name 118 identifying an entity's name to be displayed by the electronic message, a layout 120 identifying an arrangement of content as displayed in the electronic message, and style data 122 indicating a certain style to be applied to the content of the electronic message (e.g., themes, color schemes, etc.).

An electronic message version 106 can include electronic data having interactive content, such as clickable images or other clickable content. The interactive content is used by clients to access online content 142 hosted on a web server 140 or other server. For example, the message management application 104 can configure the server system 102 to define a campaign, a marketing program, an advertising plan, or other operation involving the transmission of electronic messages via one or more data networks 130.

The message management application 104 can include one or more suitable software modules. In the example depicted in FIG. 1, the message management application 104 includes a message testing module 106, a message editing module 108, and an address management module 110. The message testing module 106 can be used to perform test transmissions of test message versions to different segments of recipients and evaluate the effectiveness of the test message versions. Evaluating the effectiveness of the test message versions can include, for example, identifying a number of test messages that were opened at recipient devices 136, identifying a number of test messages having links that were clicked or otherwise accessed using the recipient devices 136, or identifying any other suitable type of interaction with the test messages at the recipient devices 136.

The message editing module 108 can provide tools that enable a user to create and edit user content. For example, a vendor application 134 executed at a vendor system 132 can access the message editing module 108 via a network 130 to create one or more electronic messages for transmission to recipient devices 136. In some embodiments, the message editing module 108 may provide tools that enable a user to create and edit email messages such as may be used in email campaigns. An email campaign can involve a process of sending an email (generally the same email) to a particular group of people.

In some embodiments, one or more of the message testing module 106 and the message editing module 108 can communicate with an email server 144. The email server 144 can prepare and send emails or other electronic messages in a campaign to recipients using email addresses stored in address lists of a recipient database 126. Addresses in the recipient database 126 may be entered and organized using tools provided by the address management module 110. In additional or alternative embodiments, a separate email server 144 can be omitted. For example, one or more of the message testing module 106 and the message editing module 108 can communicate with an email service or other suitable software executed on the server system 102 and can thereby configure the server system 102 to transmit emails or other electronic messages.

A vendor system 132 can include any computing device or group of computing devices that can access the message management application 104 to generate, modify, or otherwise use one or more electronic message versions 112. In some embodiments, a vendor system 132 transmits one or more of the electronic message versions 112 to the server system 102 (e.g., via e-mail, via an upload interface presented in a web browser executed at a vendor system 132, etc.). In additional or alternative embodiments, a vendor system 132 remotely accesses the message management application 104 and uses the message management application 104 to generate one or more of the electronic message versions 112 (e.g., via a design interface or a data entry interface presented in a web browser executed at a vendor system 132).

The vendor system 132 depicted in FIG. 1 includes one or more processing devices for executing one or more vendor applications 134. A vendor application 134 includes program code that can be executed at the vendor system 132 for transmitting, creating, editing, modifying, or otherwise using one or more electronic message versions 112. For example, a vendor application 134 may be used to communicate with the message management application 104 and thereby generate and send online messages that are associated with a marketing campaign. In some embodiments, a vendor application 134 can be a web browser application or other suitable application that is installed on a non-transitory computer-readable medium accessible to a vendor system 132 and that can be used to remotely access one or more features of the message management application 104. In additional or alternative embodiments, a vendor application 134 can be a dedicated application installed on a non-transitory computer-readable medium that is included in or accessible to a vendor system 132.

The recipient device 136 depicted in FIG. 1 can be any computing device that accesses one or more other computing systems via the data network 130. Non-limiting examples of recipient devices 136 include smart phones, tablet computers, laptop computers, etc. Each recipient device 136 executes one or more user applications 138. A user application 138 is any application suitable for receiving and interacting with electronic message versions 112 to which the server system 102 provides access. Non-limiting examples of user applications 138 include web browser applications, e-mail applications, etc.

The web server 140 depicted in FIG. 1 can be any server, computing device, or combination of computing devices that provides access to online content 142 (e.g., webpages) that is accessible via one or more other data networks 130 (e.g., the Internet). Online content 142 may include a website for purchasing products or services that are described or depicted in electronic message versions 112. Electronic messages transmitted to recipient devices can include links to the online content 142 hosted by one or more web servers 140.

For illustrative purposes, the server system 102, the vendor system 132, the web server 140, and the email server 144 are depicted as separate systems. However, other implementations are possible. For example, a server system 102 may perform one or more of executing the message management application 104, executing the vendor application 134, and executing one or more web services that provide access to the online content 142 via the Internet.

Figure 2:
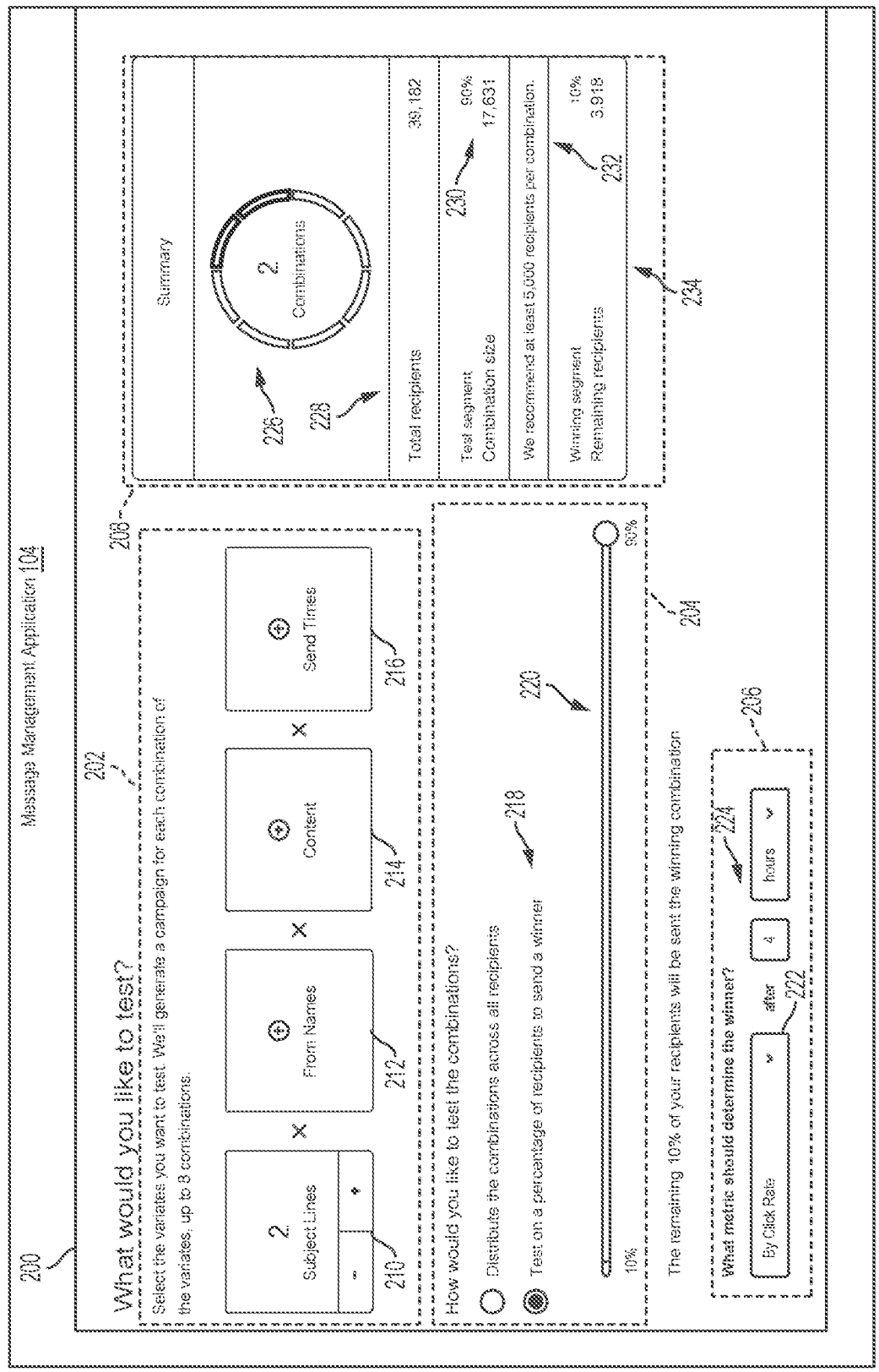
FIG. 2 is a diagram depicting an example of a graphical interface used by the message management application of FIG. 1 for selecting a number of different test message versions to be evaluated via a test transmission according to certain embodiments of the present disclosure.

The message management application 104 can provide different interfaces for display at the vendor systems 132 when managing the creation, testing, and transmission of electronic messages. For example, FIG. 2 is a diagram depicting an example of a graphical interface 200 used by the message management application 104 for selecting a number of different test message versions to be evaluated via a test transmission. The example of an interface 200 depicted in FIG. 2 includes a test version section 202, a test version section 202, test selection section 204, a metric selection section 206, and a summary section 208.

The test version section 202 provides options for selecting a number of different test message versions. In the example depicted in FIG. 2, the test version section 202 includes selectable options for varying subject lines 210, sender names 212, content attributes 214, and send times 216 for test message versions. In this example, a user has selected "2" for the subject lines 210. Thus, the message management application 104 will allow the user to create at least two different test message versions, each of which has a different subject line. Selections of the numbers of sender names 212, content attributes 214, and send times 216 will also impact the number of test message versions. For example, if the selections indicate two subject line variants, three sender name variants, and two send time variants, then the message management application 104 will use twelve (2×3×2) different test message versions, each of which has a different combination of subject line, sender name, and send time.

The test selection section 204 provides options for selecting how to test different combinations of message attributes. For instance, as depicted in FIG. 2, a user has selected an option 218 for testing a certain percentage of recipients and then sending a "winning" message to the remaining recipients. The percentage of recipients used for testing purposes is selected via the percentage option 220. In this example, the message management application 104 allows a user to select between 10% and 90% of a set of recipients for testing different test message versions. A "winning" message can be a test message version having a suitable number of interactions after the test message version is transmitted to recipients in a testing segment.

The metric selection section 206 provides options for selecting how a "winning" test message version is to be evaluated. For example, the metric selection section 206 can include an option 222 for selecting a metric by which a winning test message version is to be evaluated (e.g., number of clicks on links, number of opened messages, etc.). The metric selection section 206 can also include an option 224 for selecting a time period over which the evaluation should occur. For example, in FIG. 2, a time period of four hours has been selected using via the option 224. Thus, interactions with test messages (e.g., clicks) that occur within four hours of sending the test messages will be used by the message management application 104 for evaluating the effectiveness of test message versions.

In some aspects, the message management application 104 can use a variable time period for monitoring interactions with test messages. For example, the message management application 104 can provide an option in which the message management application 104 selects a winning message after a sufficient number of interactions have occurred to determine a winner. The message management application 104 can check, at certain intervals (e.g., every ten minutes), whether a sufficient number of interactions have occurred. The message management application 104 can select a winning message responsive to, or otherwise based on, determining that the sufficient number of interactions having occurred. In some aspects, this option can allow users to select a maximum amount of time (e.g., four hours) that the message management application 104 will monitor interactions with test messages (e.g., every 10 minutes during the four hour period until a sufficient number of interactions have been identified).

The summary section 208 provides information about a test transmission of test messages that will result from the selected options. For example, the summary section 208 can identify a number of different test message versions 226 ("combinations"), which corresponds to the options selected via the test version section 202. The summary section 208 can also identify a number of recipients 228. The number of recipients 228 can be the total pool of recipients that will receive a test message or a winning message.

The summary section 208 can also identify a segment size that corresponds to the options selected in the test version section 202 and the test selection section 204. In the example depicted in FIG. 2, since only two test message versions (i.e., two variations on a subject line) have been selected and 90% of the 39,182 recipients will be used for testing purposes, the resulting segment size is 17,631 (i.e., 90% of 39,182 recipients divided into two segments). The message management application 104 can update the segment size in response to receiving different selections of options in the interface 200.

In some embodiments, the summary section 208 can also identify a recommended segment size 232. For example, a segment size that is too small may yield inaccurate evaluation data due to being insufficiently representative of a population of recipients. The message management application 104 can display the recommended segment size 232 to guide a user in selecting options for a test transmission. For example, as a user selects more message attributes to be varied, more variations in a given message attribute, or both, the actual segment size will decrease due to the pool of test recipients being further sub-divided.

In some embodiments, if the actual segment size decreases below the recommended segment size 232, the message management application 104 can output a warning, suggestion, or other alert via the interface 200. In other embodiments, the message management application 104 can restrict the options available to a user, such that the actual segment size cannot decrease below the recommended segment size 232.

In one example, if the user selects an option in section 202 that would cause the actual segment size to decrease below the recommended segment size 232, the message management application 104 can modify the selection so that the actual size is greater than or equal to the recommended segment size 232. For instance, in the example depicted in FIG. 2, using more than six test message versions may cause the segment size to decrease below 5,000 recipients per segment. Thus, if a user selects two subject lines 210, then selects two sender names 212, and then selects two send times 216 (i.e., a total of 2×2×2=8 different test message versions), the message management application 104 can modify the selection so that only one subject line 210, only one sender name 212, or only one send time 216 is used (i.e., a total of 2×2×1=4 test message versions). Alternatively, if a user selects two subject lines 210 and then selects four sender names 212 (i.e., a total of 2×4=8 different test message versions), the message management application 104 can modify the selection so that only two subject lines 210 and three sender names are used (i.e., a total of 2×3=6 test message versions).

Figure 3:
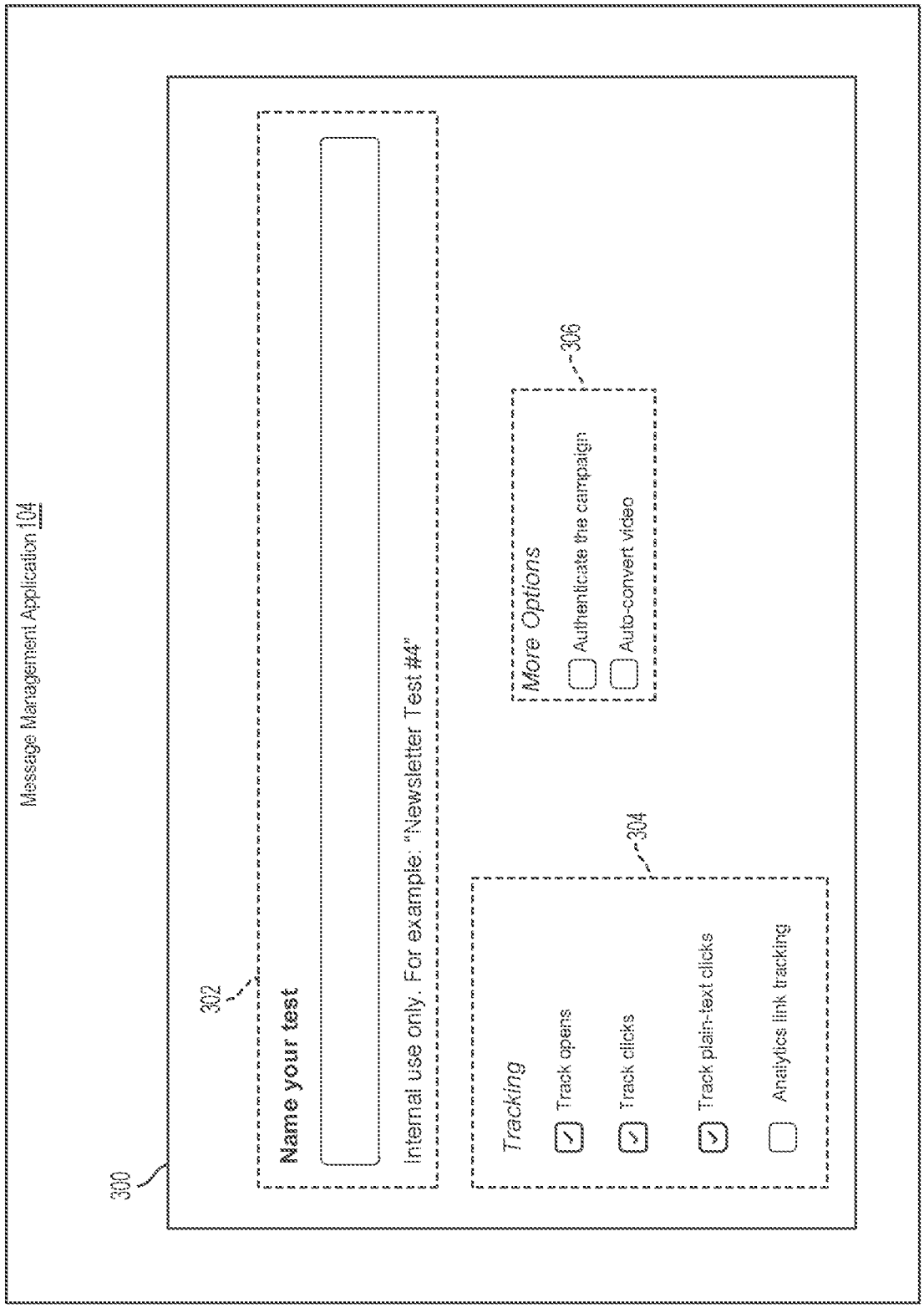
FIG. 3 is a diagram depicting an example of a graphical interface used by the message management application of FIG. 1 for selecting options associated with a test transmission according to certain embodiments of the present disclosure.

The message management application 104 can also provide other interfaces for controlling options associated with a test transmission, such as the interface 300 depicted in FIG. 3. In this example, the interface 300 includes a field 302 for naming the test transmission. The interface 300 also includes a tracking option 304 for identifying which interactions with electronic messages are to be used when evaluating the effectiveness of different message versions. The interface 300 also includes additional options 306 for controlling other aspects of the test transmission (e.g., authentication options, auto-converting media to an appropriate format for sending via email, etc.).

Figure 4:
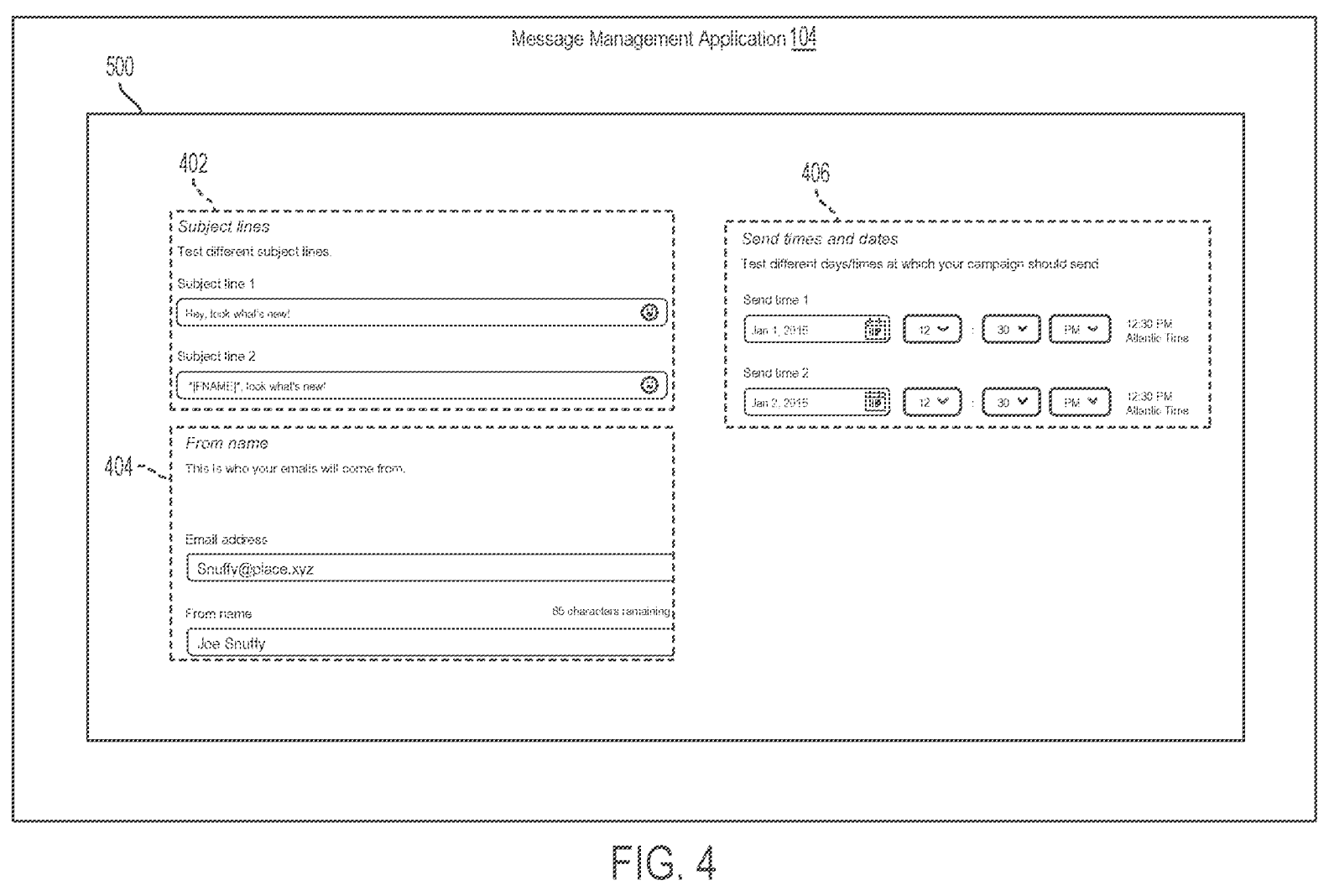

The message management application 104 can also provide other interfaces for providing values of different message attributes, such as the interface 400 depicted in FIG. 4. In this example, the message management application 104 determines from a selection of options in interface 200 that two different subject lines, two different sender names, and two different send times will be used for, in total, six different test message versions. Section 402 includes fields for inputting text of subject lines. Section 404 includes fields for inputting sender names. Section 406 includes fields for inputting or otherwise selecting send times.

Figure 5:
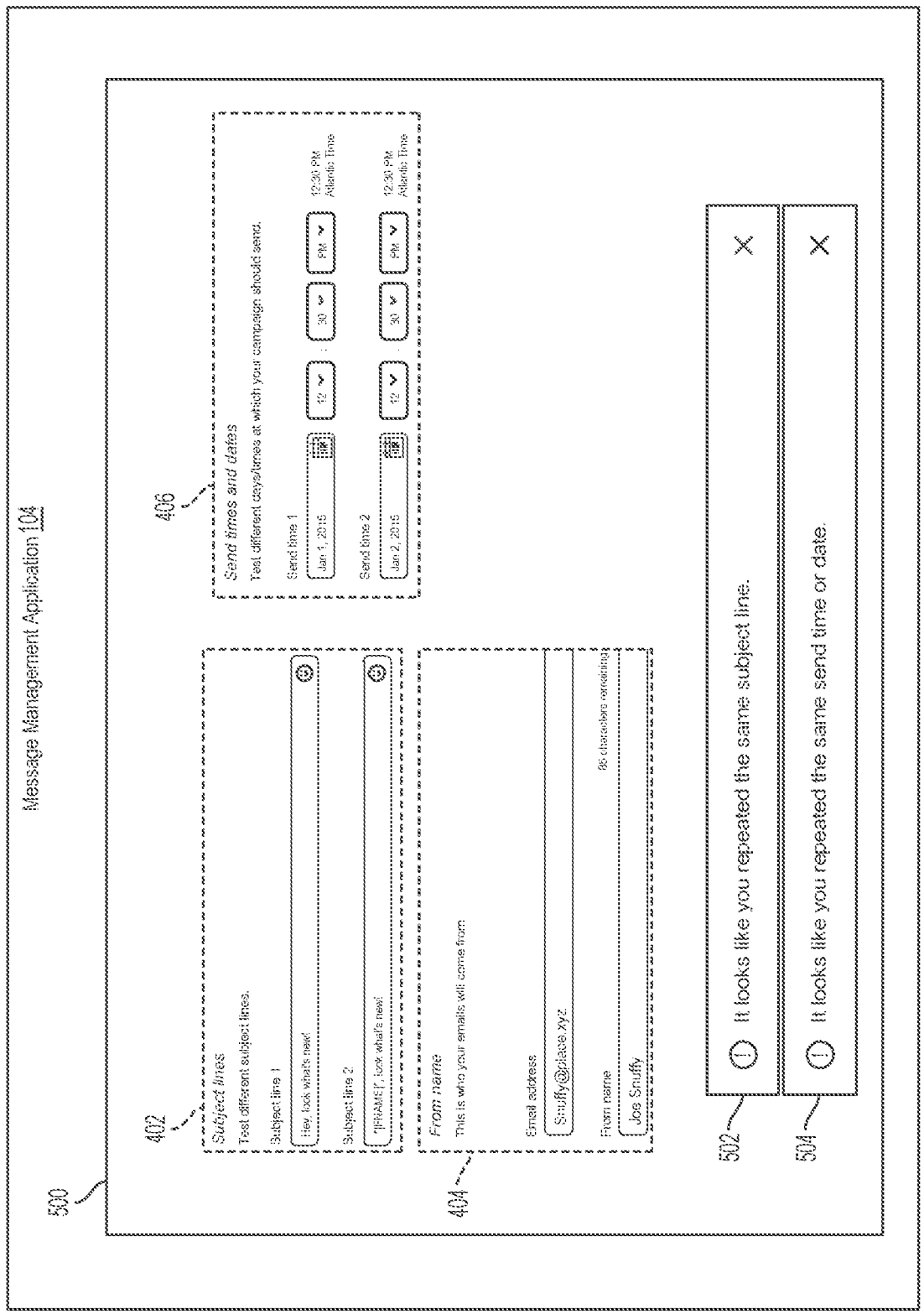
FIG. 5 is a diagram depicting an example of a graphical interface used by the message management application of FIG. 1 for identifying potential adverse impacts resulting from the selection of different message attributes according to certain embodiments of the present disclosure.

In some embodiments, the message management application 104 can determine if the values entered into the interface 400 will result in identical or nearly identical test message versions. For example, FIG. 5 is a diagram depicting an example of an updated graphical interface 400 that identifies potential adverse impacts resulting from the selection of different message attributes. Adverse impacts can include using message attribute values for different test message versions that are unlikely to result in materially different levels of interaction with the test messages. The message management application 104 can determine these adverse impacts based on identifying which message attributes are to be varied (e.g., using the options selected via test version section 202 in interface 200) and determining whether a sufficient amount of variation exists for the identified message attribute.

In this example, the subject lines inputted at section 402 are virtually identical, as both subject lines include a word followed by the phrase "look what's new." The message management application 104 can determine, based on the two subject lines having a threshold similarity, that the different test message versions are unlikely to result in materially different levels of interaction (e.g., clicks, opens, etc.). Based on this determination, the message management application 104 can display an alert 502 indicating the similarity in the subject lines. This alert can prompt the user to modify one of the subject lines so that a similarity between the two subject lines falls below a threshold similarity.

In some aspects, the message management application 104 can provide access to one or more tools for composing effective subject lines. For example, the message management application 104 can analyze a subject line entered into section 402. The analysis can involve identifying words, phrases, or other semantic content within the subject line. The analysis can also involve comparing the identified words, phrases, or other semantic content to stored subject line content in a database accessible to the message management application 104. For example, the message management application 104 can maintain a database of subject lines and effectiveness scores associated with the subject lines. The message management application 104 can provide, based on this comparison, feedback regarding the effectiveness of a subject line entered at section 402.

In the example depicted in FIG. 5, the send times selected in section 406 are also identical. The message management application 104 can determine, based on the selected send times being identical, that the different test message versions are unlikely to result in materially different levels of interaction (e.g., clicks, opens, etc.). Based on this determination, the message management application 104 can display an alert 504 indicating that the send times are identical. This alert can prompt the user to choose a different send time for at least one of the test message versions.

In some aspects, the message management application 104 can provide access to one or more tools for selecting send times that are more likely to result in interaction with an electronic message. For example, the message management application 104 can identify a date-time group entered into section 406. The message management application 104 can analyze the date-time group for effectiveness and provide feedback on the effectiveness (e.g., warning that the time slot in the date-time group is associated with low click rates, suggesting an alternative time slot, etc.). In some aspects, the message management application 104 can analyze the send time based on historical data for message recipients that have interacted with messages (e.g., by weighting an analysis toward recipients who have engaged with messages rather than recipients who have ignored the messages). In additional or alternative aspects, the message management application 104 can use a click-to-send ratio to recommend a timeslot in which to send a message, which can account for timeslots that have a higher-than-normal rate of sending.

Figure 6:
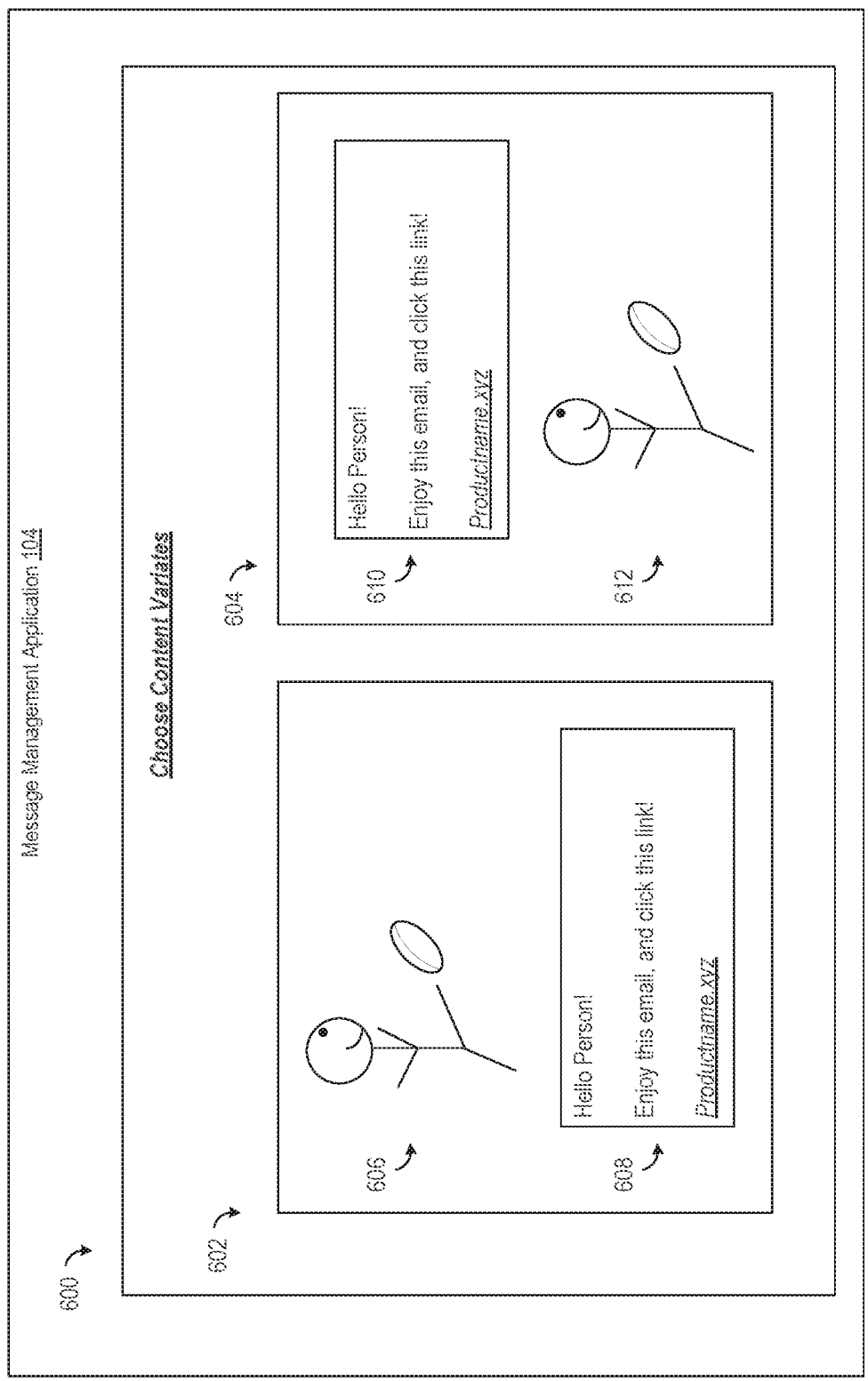
FIG. 6 is a diagram depicting an example of a graphical interface used by the message management application of FIG. 1 for selecting different layouts used in different test message versions according to certain embodiments of the present disclosure.

In some embodiments, the message management application 104 can allow a user to select different layouts or other content attributes for test messages. For example, FIG. 6 is a diagram depicting an example of a graphical interface 600 used by the message management application 104 for selecting different layouts. In this example, a user has created, selected, or otherwise identified a first layout 602 for a first test message version and a second layout 604 for a second test message version. In the first layout 602, a graphic 606 is positioned above text 608 in the test message version. In the second layout 604, text 610 is positioned above a graphic 606 in the test message version.

Figure 7:
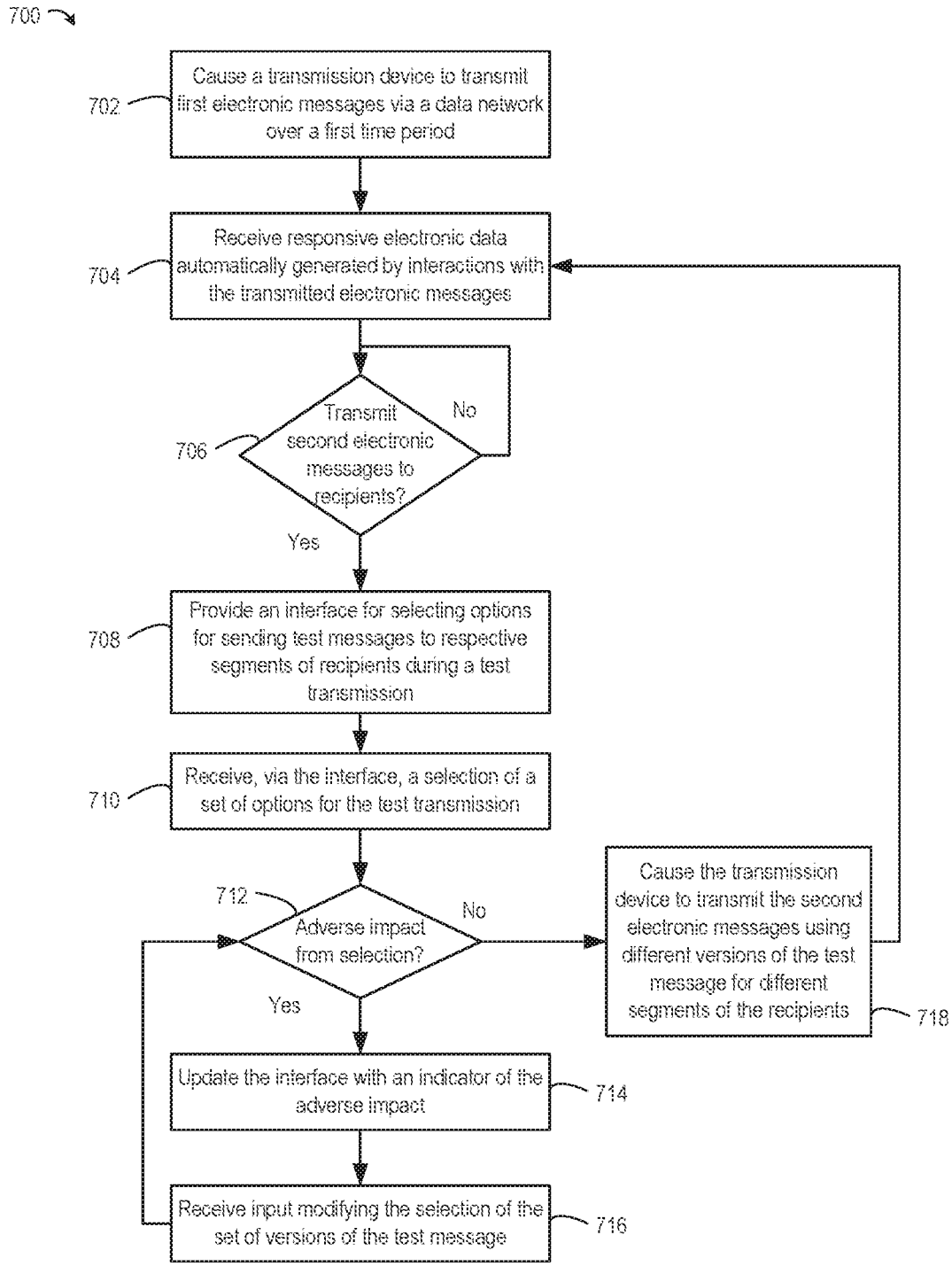
FIG. 7 is a flow chart depicting an example of a process performed by the message management application of FIG. 1 for optimizing an evaluation of effectiveness of multiple versions of electronic messages transmitted to multiple segments of recipients according to certain embodiments of the present disclosure.

FIG. 7 is a flow chart depicting an example of a process 700 performed by the message management application 104 for optimizing an evaluation of effectiveness of multiple electronic message versions 112 transmitted to multiple segments of recipients according to certain embodiments of the present disclosure. For illustrative purposes, the process 700 is described with reference to the implementation depicted in FIGS. 1-6. Other implementations, however, are possible.

The process 700 involves causing a transmission device to transmit first electronic messages via a data network over a first time period, as depicted in block 702. For example, the message management application 104 can be executed by a suitable processing device to perform one or more operations suitable for implementing block 702. In some embodiments, the operations may include configuring the server system 102 to transmit suitable instructions to an email server 144 that is in communication with the server system 102 via one or more data networks 130. The email server 144 can transmit the first electronic messages in response to receiving the instructions from the server system 102. In other embodiments, the operations may include configuring the server system 102 to transmit the first electronic messages directly, without routing the emails through a separate email server 144. For example, if the server system 102 provides email services, the message management application 104 can configure a processing device of the server system 102 to transmit the first electronic messages via a network interface device of the server system 102.

The process 700 also involves receiving responsive electronic data that is automatically generated by interactions with the first electronic messages, as depicted in block 704. For example, the message management application 104 can be executed by a suitable processing device to perform one or more operations suitable for implementing block 704. The operations may include receiving responsive electronic data that indicates how users interacted with electronic messages (e.g., opening the electronic messages, clicking on links in the electronic messages, etc.). The responsive electronic data can be any data that is automatically generated or provided to the message management application 104 as a result of the user interacting with an electronic message.

The responsive electronic data can be generated in any suitable manner. In some embodiments, the first electronic messages can include program code that causes a notification to be transmitted from a recipient device 136 to the server system 102 in response to an electronic message being opened at the recipient device 136. The notification can be transmitted to the server system 102 without notifying a viewer of the electronic message at the recipient device 136.

In other embodiments, the responsive electronic data can include data that is provided to the message management application 104 as a result of the recipient device 136 accessing online content 142 via one of the first electronic messages. For example, a link to the online content 142 that is included in an electronic message may include a URL parameter that causes the web server 140 to notify the server system 102 that a link has been clicked. A non-limiting example of the parameter is an alphanumeric string that provides an identifier for a campaign involving the transmission of the electronic messages. The web server 140 can use the identifier included in the URL parameter to uniquely identify a visit to the website. The web server 140 can respond to receiving the URL parameter by notifying the server system 102 that a recipient device 136 to Which an electronic message was transmitted accessed the online content 142 during a certain time period.

The process 700 also involves determining whether second electronic messages are to be transmitted to recipients, as depicted in block 706. For example, the message management application 104 can be executed by a suitable processing device to perform one or more operations suitable for implementing block 706. The operations may include receiving a command, a request, or other input from one or more vendor applications 134 via one or more data networks 130. The command, request, or other input indicates to the message management application 104 that a vendor or other user wishes to use the message management application 104. In the absence of such input, the process 700 returns to block 706 and the message management application 104 can continue waiting for requests from vendors or other users.

If the second electronic messages are to be transmitted to recipients, the message management application 104 can be executed by the server system 102 to control or otherwise influence one or more aspects of the transmission based on the responsive electronic data received at block 702. The message management application 104 can perform this control by executing one or more operations described with respect to blocks 706-718.

For example, the process 700 also involves providing an interface selecting options for sending test messages to respective segments of recipients during a test transmission, as depicted in block 708. For example, the message management application 104 can be executed by a suitable processing device to perform one or more operations suitable for implementing block 708.

The operations may include generating, updating, or otherwise providing a graphical interface that can receive input identifying a number of different test message versions to be used and different message attributes to be varied among the test message versions. Examples of such an interface include such as (but not limited to) one or more of the interfaces 200, 300, 400, or 600 described herein. For instance, the message testing module 106 can generate an interface 200 that elicits inputs for selecting which message attributes are to be varied to select or create different test message versions. Examples of these message attributes include (but are not limited to) subject lines, sender addresses, sender names, content layouts, style data, and send times.

The operations may also include generating, updating, or otherwise providing a graphical interface that can receive input identifying other options for the test transmission, such as the specific interaction to be monitored (e.g., opening the electronic message, clicking a link in the electronic message, or responding to the electronic message), the time period over which the monitoring will occur, or both. For instance, the message testing module 106 can generate an interface 200 that elicits, via the option 222, inputs for selecting a specific interaction to be monitored when evaluating the effectiveness of a given test message version. The message testing module 106 can also include an option 224 in the interface 200 that elicits inputs for selecting a time period over which the effectiveness of different test message versions will be evaluated.

The operations may also include transmitting data that includes the interface to a vendor system 132 via one or more data networks 130. For example, the message management application 104 can transmit the interface to a dedicated vendor application 134 executed on a vendor system 132. The vendor application 134 can render the interface for display at the vendor system 132, thereby allowing a vendor to select or otherwise input various attributes of a test transmission. The vendor application 134 can transmit the received input to the message management application 104 via the data network 130.

The process 700 also involves receiving, via the interface, a selection or other indication of a set of options for the test transmission, as depicted in block 710. For example, the message management application 104 can be executed by a suitable processing device to perform one or more operations suitable for implementing block 710. The operations may include the message management application 104 receiving one or more messages from a vendor system 132 via one or more networks 130. The messages from the vendor system 132 can identify selections or other input that are received via a graphical interface (e.g., one or more of interfaces 200, 300, 400, 600) that was displayed at the vendor system 132.

The process 700 also involves determining whether the selection of the options for the test transmission may cause an adverse impact on evaluating the effectiveness of different electronic message versions, as depicted in block 712. For example, the message management application 104 can be executed by a suitable processing device to perform one or more operations suitable for implementing block 712.

In some embodiments, these operations can include determining that a number of test message versions to be used will result in a sub-optimal segment size for the test transmission. For example, the message management application 104 can retrieve or otherwise access a set of recipients from the recipient database 126. A subset of these recipients can be used for testing different message versions, where different segments of recipients used for testing receive different test message versions. The message testing module 106 can select segments of recipients that do not overlap (e.g., such that a given recipient will not receive multiple versions of a test message). In this manner, the subset of these recipients used for testing purposes is divided into segments.

Because the subset of these recipients used for testing purposes is divided into segments based on the number of test message versions to be used, the number of recipients in each segment decreases as the number of test message versions increases. For example, using three test message versions for a pool of 900 recipients may result in segment sizes of 300 recipients per segment, while using four test message versions for this pool of 900 recipients may result in segment sizes of 225 recipients per segment.

The message testing module 106 can compare a segment size, which results from a selected number of test message versions, with a threshold segment size retrieved from a non-transitory computer-readable medium accessibly to the server system 102. The threshold segment size can indicate a minimum number of recipients required for a segment to provide reliable, accurate, or otherwise useful data when evaluating the effectiveness of a test message version. The threshold segment size can be determined in any suitable manner.

In additional or alternative embodiments, these operations can include determining that time period over which the effectiveness of the test message versions are to be evaluated provide sub-optimal testing results. In one example, the message testing module 106 can determine an optimal or otherwise preferable time period used with a test transmission based on analytics data indicating the time periods in which recipients of electronic messages are more likely to interact with the electronic messages. For instance, the analytics data may indicate that 50% of interactions (e.g., clicks, responses, etc.) occur within the first two hours after transmission of electronic content and that 95% of interactions (e.g., clicks, responses, etc.) occur within the first six hours after transmission of electronic content. Thus, an evaluation period of six hours is more likely to present an accurate picture of how many recipients interacted with a given test message.

The message testing module 106 can retrieve the analytics data from a non-transitory computer-readable medium and use the retrieved analytics data to identify a time period (or a range of time periods) preferable for a test transmission. The time period or range of time periods may be preferable if, for example, the effectiveness of a test message version can be determined more accurately using the time period or range of time periods. The message testing module 106 can compare the identified time period to a time period included in the selection received at block 710. If the time period included in the selection is less than the time period or range of time periods identified as preferable, the message testing module 106 can determine that the time period will adversely impact the test transmission. In some aspects, a user can use a send-time optimization feature, as described above, to select the scheduled time to start the test.

If the selection of a set of test message versions could cause an adverse impact, the process 700 proceeds to block 714, which involves updating the interface with an indicator of the adverse impact. In one example, the message management application 104 is executed by a suitable processing device to implement block 714.

The operations for implementing block 714 may include generating an updated version of the interface that includes an alert or other message identifying the adverse impact. For example, the interface 200 depicted in FIG. 2, the segment size section 230 may be highlighted in red or otherwise updated to indicate that the segment size resulting from the selected set of test message versions would be less than a threshold segment size. The operations for implementing block 714 may also include transmitting data that includes the updated interface to a vendor system 132 via one or more data networks 130, in a manner similar to the operations described above with respect to block 708.

The process 700 also involves receiving input modifying the selection of the set of versions of the test message, as depicted in block 716. For example, the message management application 104 can be executed by a suitable processing device to perform one or more operations suitable for implementing block 716. The operations may include the message management application 104 receiving one or more messages from a vendor system 132 via one or more networks 130. The messages from the vendor system 132 can identify additional selections or other input that are received via an updated graphical interface (e.g., one or more of interfaces 200, 300, 400, 600) that was displayed at the vendor system 132 subsequent to block 714. The process 716 returns to block 712 to assess the potential for an adverse impact for the set of test message versions that are modified based on the input received via the interface.

If, at block 716, the message management application 104 determines that the selection of a set of test message versions does not present a potentially adverse impact, the process 700 proceeds to block 718, which involves causing the transmission device to transmit the second electronic messages using different versions of the test message for different segments of the recipients. For example, the message management application 104 can be executed by a suitable processing device to perform one or more operations suitable for implementing block 718.

In some embodiments, the operations may include configuring the server system 102 to transmit suitable instructions to an email server 144 that is in communication with the server system 102 via one or more data networks 130. The email server 144 can transmit the first electronic messages in response to receiving the instructions from the server system 102. In other embodiments, the operations may include configuring the server system 102 to transmit the first electronic messages directly, without routing the emails through a separate email server 144. For example, if the server system 102 provides email services, the message testing module 106 can retrieve or otherwise access email addresses for multiple segments from a recipient database 126 or other suitable data structure. The message management application 104 can configure a processing device of the server system 102 to transmit the second electronic messages to the retrieved recipient addresses via a network interface device of the server system 102.

The process 700 can return to block 704, in which server system 102 can also receive responsive electronic data automatically generated by interactions with the second electronic messages. In some embodiments, the message testing module 106 can use the responsive electronic data received for the second transmissions to determine which of the test message versions should be sent to addition recipients. For example, the message testing module 106 can determine, for each of the transmitted test message versions, a respective subset of the responsive electronic data resulted from interactions with that transmitted test message version. These subsets of responsive electronic data can include, for example, numbers of clicks for respective test message versions, numbers of opens for respective test message versions, etc.

In some embodiments, the message management application 104 can update, based on the determined subsets of responsive electronic data, an interface provided to a vendor system with an option to transmit one or more of the transmitted test message versions to an additional segment of the recipients. In one example, this option can allow a user to select the test message version with the largest number of interactions (e.g., clicks, opens, etc.) to be sent to other recipients that were not included in the test transmission.

In some embodiments, the option to send a given test message version allows the selected test message version to be sent to other segments that received different test message versions in the test transmission. For example, if test message versions A, B, and C were transmitted to segments A, B, C and during a test transmission, and the message testing module identifies test message version A as a "winner" based on responsive electronic data received as a result of the test transmission, then the message management application 104 can provide an option to send version A to segments B and C after the test transmission.

In additional or alternative embodiments, the message management application 104 may use the results of the test transmission to provide suggestions or restrict options regarding the subsequent transmission of the test message version A. In the example above, if the message testing module 106 determines that the number of interactions with non-winning test message version B is above a threshold number of interactions, the message testing module 106 may exclude the segment B from a list of potential recipients for the winning test message version A. Conversely, if the message testing module 106 determines that the number of interactions with non-winning test message version C is below a threshold number of interactions, the message testing module 106 may include the segment C in the list of potential recipients for the winning test message version A. Additionally or alternatively, when providing an option in an interface to send the winning test message version A to other recipients, the message management application 104 can include an alert or other indicator indicating that the test message version B received the threshold number of interactions, that the test message version C failed to receive the threshold number of interactions, or both. This indicator can allow a user to determine whether the segments B and C should be selected for a subsequent transmission of a winning test version A to additional recipients.

In some aspects, the message management application 104 may use certain combinations of interactions with non-winning emails to identify a winning email. For example, the message management application 104 may only use subscriber behavior (e.g., click and open) to control the transmission of a winning email. The message management application 104 can use a non-winning email for data-collection regarding this behavior.

In additional or alternative embodiments, one or more operations described above for a "winning" test message version can be automated, thereby eliminating the need for additional user input from a vendor system to cause a transmission of the winning test message version subsequent to the test transmission. For example, the message management application 104 can automatically cause the winning test message version to be transmitted to additional recipients other the testing segment for the winning test message version. The message management application 104 can cause this automatic transmission in response to determining that a largest subset of the responsive electronic data was generated by interactions with that test message versions as compared to the other test message versions.

In some embodiments, the message management application 104 can exclude other testing segments from this automatic transmission of the winning test message version. In other embodiments, the message management application 104 can include at least some of the other testing segments in this automatic transmission. In one example, all testing segments can be included in this automatic transmission. In another example, certain testing segments can be included in this automatic transmission based on the performance of their associated test message versions. For example, if the message testing module 106 determines, based on the responsive electronic data, that a given test message version resulted in a number of interactions during an evaluation time period that is less than a threshold number of interaction, the message management application 104 can automatically select the segment of recipients associated with that test message version for inclusion in an automatic transmission of the winning test message version.

Figure 8:
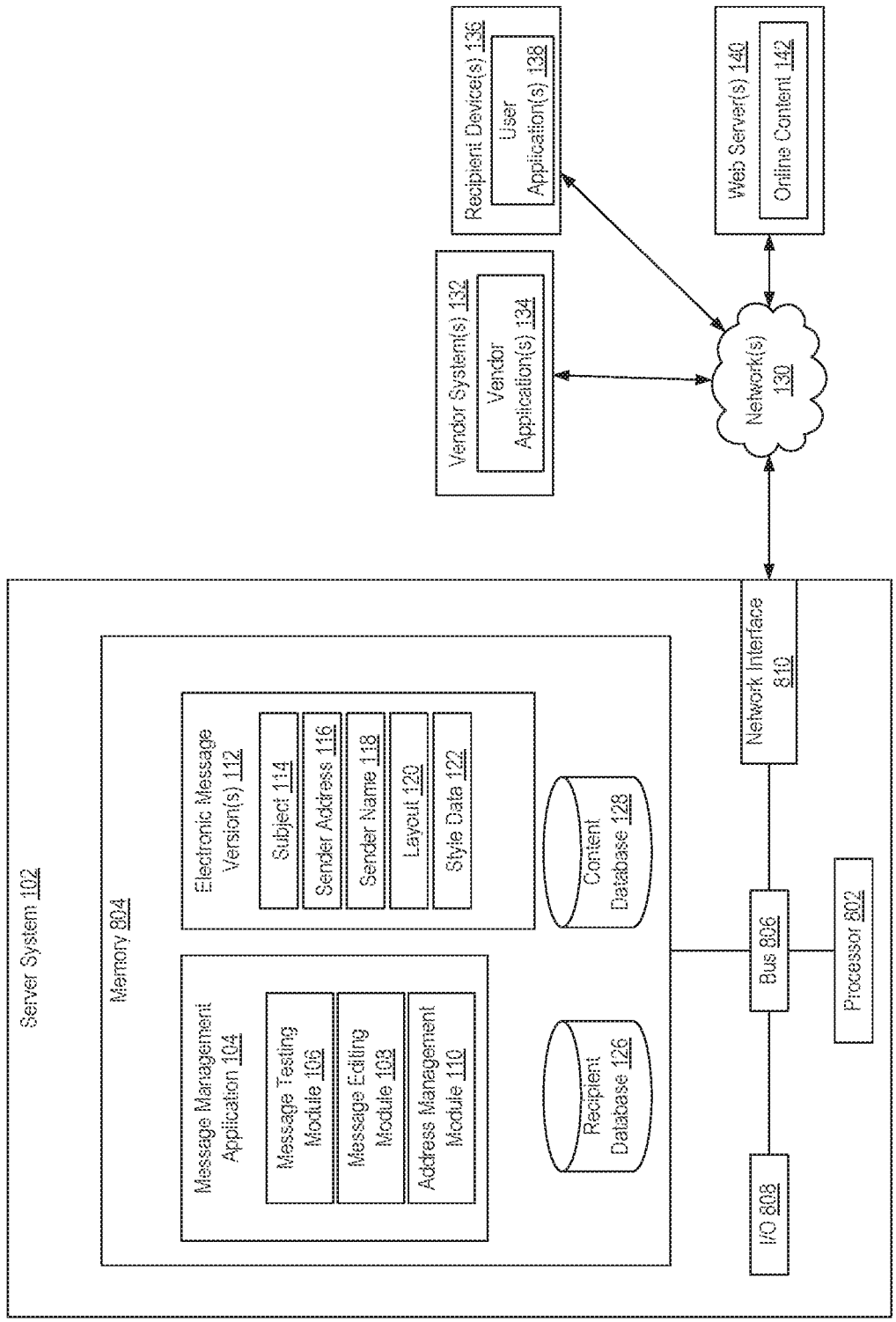
FIG. 8 is a block diagram depicting an example of the server system of FIG. 1 according to certain embodiments of the present disclosure.

Any suitable computing system or group of computing systems can be used to implement the server system 102. For example, FIG. 8 is a block diagram depicting an example of a server system 102 that executes a message management application for optimizing the effectiveness of different electronic message versions.

The server system 102 can include a processor 802 that is communicatively coupled to a memory $04. The processor $02 performs one or more of executing computer-executable program code stored in the memory 804 and accessing information stored in the memory 804. When executed by the processor 802, instructions stored in the memory 804 cause the processor 802 to perform one or more operations described herein. The processor 802 may include a microprocessor, an application-specific integrated circuit ("ASIC"), or other processing device. The processor 802 can include any number of processing devices.

The memory 804 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read program code. The program code may include processor-specific instructions generated by one or more of a compiler and an interpreter from code written in any suitable computer-programming language, including, for example, C, C++, C#, Visual Basic, Java, Python, Perl, JavaScript, and ActionScript.

The server system 102 may also include a number of external or internal devices such as input or output devices. For example, the server system 102 is shown with an input/output (I/O) interface 808 that can receive input from input devices or provide output to output devices. A bus 806 can also be included in the server system 102. The bus 806 can communicatively couple one or more components of the server system 102.

The server system 102 can execute program code that configures the processor 802 to perform one or more of the operations described above with respect to FIGS. 1-10. The program code can include, for example, the message management application 104. The program code may be resident in the memory 804 or any suitable computer-readable medium and may be executed by the processor 802 or any other suitable processor. In some embodiments, the electronic message versions 112 and associated data can be resident in the memory 804, as depicted in FIG. 8. In other embodiments, one or more of the electronic message versions 112 and other associated data can reside in a memory that is accessible via a data network (e.g., a memory accessible via a cloud service or other data network service.)

The server system 102 can also include at least one network interface 810. The network interface 810 can include any device or group of devices (e.g., a receiver device, a transmission device, or some combination thereof) suitable for establishing a wired or wireless data connection to one or more data networks 130. Non-limiting examples of the network interface 810 include an Ethernet network adapter, a modem, and any other suitable communication device. The server system 102 can communicate with one or more vendor systems 132, one of more recipient devices 136, or both using the network interface 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, broken into sub-blocks, or some combination thereof. Certain blocks or processes can be performed in parallel.

The use of "adapted to" or "configured to" herein is meant as open and inclusive language that does not foreclose devices adapted to or configured to perform additional tasks. The use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of and equivalents to such embodiments. Accordingly, it should be understood that the present disclosure has been presented for purposes of example rather than limitation, and does not preclude the inclusion of such modifications, variations, additions to the present subject matter as would be readily apparent to one of ordinary skill in the art.

The invention claimed is:

1. A method comprising:
    receiving, subsequent to first electronic messages being transmitted via a data network over a first time period, responsive electronic data automatically generated by interactions with the first electronic messages; and
    controlling, by a server and based on receiving the responsive electronic data, transmission of second electronic messages to recipients via the data network, wherein controlling the transmission of the second electronic messages comprises:
        providing an interface for selecting options used for a test transmission of different test message versions to respective segments of recipients, wherein each test message version includes a different combination of message attributes,
        receiving, via the interface, a selection of options for the test transmission,
        identifying, based on an analysis of the responsive electronic data, an adverse impact on the test transmission associated with the selection of the options, wherein the adverse impact comprises a decrease in one or more of (a) a reliability of an effectiveness analysis of responses to the second electronic messages and (b) an accuracy of the effectiveness analysis of the responses to the second electronic messages, wherein identifying the adverse impact comprises:
            determining segments corresponding to a selected set of test message versions corresponding to the selected options,
            determining that one of the segments has a segment size that is less than a threshold segment size determined from the responsive electronic data, wherein the one or more of the reliability and the accuracy being decreased is attributable to using the segment size that is less than the threshold segment size,
            identifying, from the selection of the options, a time period for evaluating additional responsive electronic data automatically generated by interactions with the second electronic messages, and
            determining that the time period is less than a threshold time period for accurately evaluating an effectiveness of the test transmission, wherein the one or more of the reliability and the accuracy being decreased is attributable to using the time period that is less than the threshold time period,
        updating, based on identifying the adverse impact, the interface with an indicator of the adverse impact, wherein updating the interface with the indicator of the adverse impact comprises updating the interface to display an indication that the segment size is less than the threshold segment size, wherein updating the interface with the indicator further comprises one or more of:
            (a) causing the interface to display a suggestion to decrease a number of the different test message versions,
            (b) causing the interface to display a suggestion to increase a size of a set of test recipients from which the segments of recipients are determined,
            (c) causing the interface to display a suggestion to increase the time period, and
            (d) rejecting a user input specifying a change to the options that results in the adverse impact,
        receiving, via the interface and subsequent to updating the interface, a modification to the options for the test transmission, and
        configuring, based on receiving the modification to the options for the test transmission, a transmission device to transmit the second electronic messages, wherein the second electronic messages include test message versions corresponding to the modified options and each test message version is transmitted from the transmission device to a different segment of the recipients.

2. The method of claim 1, wherein the message attributes comprise at least two of a subject line, a sender address, a sender name, a layout of content, and a style.

3. The method of claim 1, wherein controlling the transmission further comprises modifying, responsive to receiving the modification to the options, the selected set of test message versions to decrease air the number of test message versions in the selected set of test message versions, wherein decreasing the number of test message versions increases segment sizes of the respective segments corresponding to the test message versions.

4. The method of claim 1, wherein:
    receiving the modification comprises receiving, subsequent to updating the interface, input via the interface modifying the time period;
    the method further comprises evaluating, by the server and subsequent to the transmission device transmitting the second electronic messages, the additional responsive electronic data received during the modified time period.

5. The method of claim 1, further comprising:
receiving the additional responsive electronic data, the additional responsive electronic data automatically generated by interactions with the second electronic messages;
determining, for the transmitted test message versions, respective subsets of the additional responsive electronic data that were generated by interactions with the transmitted test message versions; and
updating, based on the determined subsets of additional responsive electronic data, the interface with an option to transmit a subset of the transmitted test message versions to an additional segment of the recipients.

6. The method of claim 1, further comprising:
receiving the additional responsive electronic data, the additional responsive electronic data automatically generated by interactions with the second electronic messages;
determining, based on receiving the additional responsive electronic data, that a largest subset of the additional responsive electronic data was generated by interactions with one of the test message versions as compared to each other test message version; and
configuring the transmission device to transmit, to an additional segment of the recipients, the transmitted test message version associated with the largest subset.

7. The method of claim 1, wherein receiving the responsive electronic data comprises receiving, from a web server, parameter values associating visits to a website with a clicks on links within the first electronic messages.

8. The method of claim 1, wherein receiving the responsive electronic data comprises receiving, from user devices, indicators generated by opening the first electronic messages at the user devices.

9. A server system comprising:
a receiver device configured for receiving, subsequent to first electronic messages being transmitted via a data network over a first time period, responsive electronic data automatically generated by interactions with the first electronic messages;
a non-transitory computer-readable medium;
a processing device communicatively coupled to the non-transitory computer-readable medium and the receiver device, the processing device configured for executing program code stored in the non-transitory computer-readable medium and thereby controlling, based on the received responsive electronic data, transmission of second electronic messages to recipients via the data network, wherein controlling the transmission of the second electronic messages comprises:
providing an interface for selecting options used for a test transmission of different test message versions to respective segments of recipients, wherein each test message version includes a different combination of message attributes,
receiving, via the interface, a selection of options for the test transmission,
identifying, based on an analysis of the responsive electronic data, an adverse impact on the test transmission associated with the selection of the options, wherein the adverse impact comprises a decrease in one or more of (a) a reliability of an effectiveness analysis of responses to the second electronic messages and (b) an accuracy of the effectiveness analysis of the responses to the second electronic messages, wherein identifying the adverse impact comprises:
determining segments corresponding to a selected set of test message versions corresponding to the selected options, and
determining that one of the segments has a segment size that is less than a threshold segment size determined from the responsive electronic data, wherein the one or more of the reliability and the accuracy being decreased is attributable to using the segment size that is less than the threshold segment size,
identifying, from the selection of the options, a time period for evaluating additional responsive electronic data automatically generated by interactions with the second electronic messages, and
determining that the time period is less than a threshold time period for accurately evaluating an effectiveness of the test transmission, wherein the one or more of the reliability and the accuracy being decreased is attributable to using the time period that is less than the threshold time period,
updating, based on identifying the adverse impact, the interface with an indicator of the adverse impact, wherein updating the interface with the indicator of the adverse impact comprises updating the interface to display an indication that the segment size is less than the threshold segment size, wherein updating the interface with the indicator further comprises one or more of:
(a) causing the interface to display a suggestion to decrease a number of the different test message versions,
(b) causing the interface to display a suggestion to increase a size of a set of test recipients from which the segments of recipients are determined,
(c) causing the interface to display a suggestion to increase the time period, and
(d) rejecting a user input specifying a change to the options that results in the adverse impact,
receiving, via the interface and subsequent to updating the interface, a modification to the options for the test transmission, and
causing, based on receiving the modification to the options for the test transmission, a transmission device to transmit the second electronic messages, wherein the second electronic messages include test message versions corresponding to the modified options and each test message version is transmitted from the transmission device to a different segment of the recipients; and
the transmission device, wherein the transmission device is communicatively coupled to the processing device and is configured for transmitting the second electronic messages.

10. The server system of claim 9, wherein the message attributes comprise at least two of a subject line, a sender address, a sender name, a layout of content, and a style.

11. The server system of claim 9, wherein controlling the transmission further comprises modifying, responsive to receiving the modification to the options, the selected set of test message versions to decrease a number of test message versions in the selected set of test message versions, wherein decreasing the number of test message versions increases segment sizes of the respective segments corresponding to the test message versions.

12. The server system of claim 9, wherein:
receiving the modification comprises receiving, subsequent to updating the interface, input via the interface modifying the time period;
the processing device is further configured for evaluating, subsequent to the transmission device transmitting the second electronic messages, the additional responsive electronic data received during the modified time period.

13. The server system of claim 9, wherein the processing device is further configured for:
receiving the additional responsive electronic data, the additional responsive electronic data automatically generated by interactions with the second electronic messages;
determining, for the transmitted test message versions, respective subsets of the additional responsive electronic data that were generated by interactions with the transmitted test message versions; and
updating, based on the determined subsets of additional responsive electronic data, the interface with an option to transmit a subset of the transmitted test message versions to an additional segment of the recipients.

14. The server system of claim 9, wherein the processing device is further configured for:
receiving the additional responsive electronic data, the additional responsive electronic data automatically generated by interactions with the second electronic messages;
determining, based on receiving the additional responsive electronic data, that a largest subset of the additional responsive electronic data was generated by interactions with one of the test message versions as compared to each other test message version; and
configuring the transmission device to transmit, to an additional segment of the recipients, the transmitted test message version associated with the largest subset.

15. The server system of claim 9, wherein receiving the responsive electronic data comprises receiving, from a web server, parameter values associating visits to a website with a clicks on links within the first electronic messages.

16. The server system of claim 9, wherein receiving the responsive electronic data comprises receiving, from user devices, indicators generated by opening the first electronic messages at the user devices.

17. A non-transitory computer-readable medium having program code stored thereon that, when executed by a processing device, configures the processing device to perform operations comprising:
receiving, subsequent to first electronic messages being transmitted via a data network over a first time period, responsive electronic data automatically generated by interactions with the first electronic messages; and
controlling, based on receiving the responsive electronic data, transmission of second electronic messages to recipients via the data network, wherein controlling the transmission of the second electronic messages comprises:
providing an interface for selecting options used for a test transmission of different test message versions to respective segments of recipients, wherein each test message version includes a different combination of message attributes,
receiving, via the interface, a selection of options for the test transmission,
identifying, based on an analysis of the responsive electronic data, an adverse impact on the test transmission associated with the selection of the options, wherein the adverse impact comprises a decrease in one or more of (a) a reliability of an effectiveness analysis of responses to the second electronic messages and (b) an accuracy of the effectiveness analysis of the responses to the second electronic messages, wherein identifying the adverse impact comprises:
determining segments corresponding to a selected set of test message versions corresponding to the selected options, and
determining that one of the segments has a segment size that is less than a threshold segment size determined from the responsive electronic data, wherein the one or more of the reliability and the accuracy being decreased is attributable to using the segment size that is less than the threshold segment size,
identifying, from the selection of the options, a time period for evaluating additional responsive electronic data automatically generated by interactions with the second electronic messages, and
determining that the time period is less than a threshold time period for accurately evaluating an effectiveness of the test transmission, wherein the one or more of the reliability and the accuracy being decreased is attributable to using the time period that is less than the threshold time period,
updating, based on identifying the adverse impact, the interface with an indicator of the adverse impact, wherein updating the interface with the indicator of the adverse impact comprises updating the interface to display an indication that the segment size is less than the threshold segment size, wherein updating the interface with the indicator further comprises one or more of:
(a) causing the interface to display a suggestion to decrease a number of the different test message versions,
(b) causing the interface to display a suggestion to increase a size of a set of test recipients from which the segments of recipients are determined,
(c) causing the interface to display a suggestion to increase the time period, and
(d) rejecting a user input specifying a change to the options that results in the adverse impact,
receiving, via the interface and subsequent to updating the interface, a modification to the options for the test transmission, and
configuring, based on receiving the modification to the options for the test transmission, a transmission device to transmit the second electronic messages, wherein the second electronic messages include test message versions corresponding to the modified options and each test message version is transmitted from the transmission device to a different segment of the recipients.

18. The non-transitory computer-readable medium of claim 17, wherein the message attributes comprise at least two of a subject line, a sender address, a sender name, a layout of content, and a style.

19. The non-transitory computer-readable medium of claim 17, wherein controlling the transmission further comprises modifying, responsive to receiving the modification to the options, the selected set of test message versions to decrease a number of test message versions in the selected set of test message versions, wherein decreasing the number of test message versions increases segment sizes of the respective segments corresponding to the test message versions.

20. The non-transitory computer-readable medium of claim 17, wherein:
    receiving the modification comprises receiving, subsequent to updating the interface, input via the interface modifying the time period,
    the operations further comprise evaluating, subsequent to the transmission device transmitting the second electronic messages, the additional responsive electronic data received during the modified time period.

21. The non-transitory computer-readable medium of claim 17, the operations further comprising:
    receiving the additional responsive electronic data, the additional responsive electronic data automatically generated by interactions with the second electronic messages;
    determining, for the transmitted test message versions, respective subsets of the additional responsive electronic data that were generated by interactions with the transmitted test message versions; and
    updating, based on the determined subsets of additional responsive electronic data, the interface with an option to transmit a subset of the transmitted test message versions to an additional segment of the recipients.

22. The non-transitory computer-readable medium of claim 17, the operations further comprising:
    receiving the additional responsive electronic data, the additional responsive electronic data automatically generated by interactions with the second electronic messages;
    determining, based on receiving the additional responsive electronic data, that a largest subset of the additional responsive electronic data was generated by interactions with one of the test message versions as compared to each other test message version; and
    configuring the transmission device to transmit, to an additional segment of the recipients, the transmitted test message version associated with the largest subset.

23. The non-transitory computer-readable medium of claim 17, wherein receiving the responsive electronic data comprises receiving, from a web server, parameter values associating visits to a website with a clicks on links within the first electronic messages.

24. The non-transitory computer-readable medium of claim 17, wherein receiving the responsive electronic data comprises receiving, from user devices, indicators generated by opening the first electronic messages at the user devices.

* * * * *